No. 851,974. PATENTED APR. 30, 1907.
C. H. BADGER.
BRACE FOR VEHICLE WHEELS.
APPLICATION FILED MAR. 13, 1906.
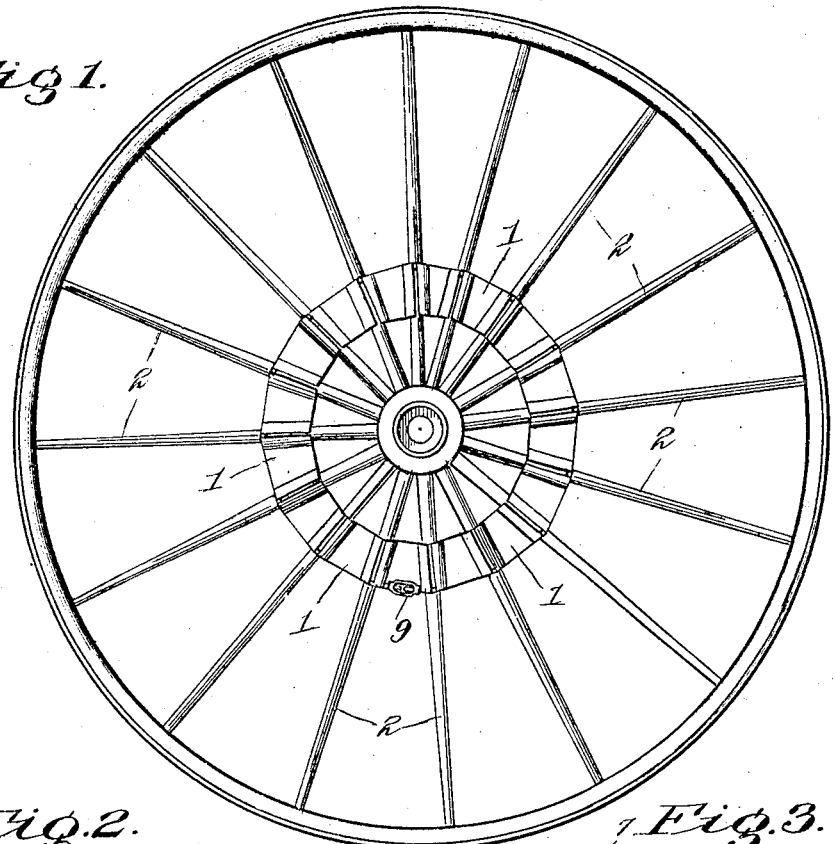
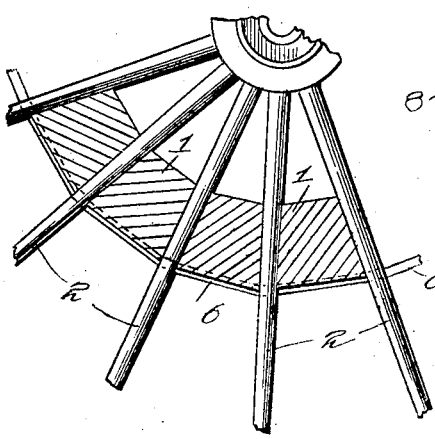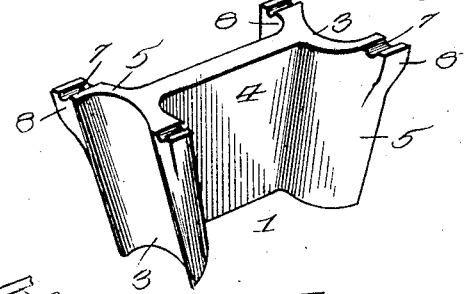
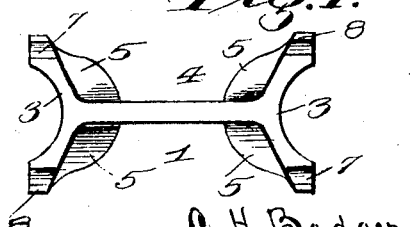
Witnesses
Inventor
C. H. Badger.

UNITED STATES PATENT OFFICE.

CAREY H. BADGER, OF ROCKY FORD, COLORADO.

BRACE FOR VEHICLE-WHEELS.

No. 851,974.      Specification of Letters Patent.      Patented April 30, 1907.

Application filed March 13, 1906. Serial No. 305,809.

To all whom it may concern:

Be it known that I, CAREY H. BADGER, a citizen of the United States, residing at Rocky Ford, in the county of Otero and State of Colorado, have invented certain new and useful Improvements in Braces for Vehicle-Wheels, of which the following is a specification.

This invention relates to an improved brace for vehicle wheels for reinforcing the same and consists essentially of a series of blocks which are located between the spokes so as to form a continuous ring and are held closely in engagement therewith.

The object of the invention is to provide a device of this character which is very simple in its construction and which can be readily applied to any vehicle wheel so as to form an effective reinforcing medium.

For a full description of the invention and the merits thereof and also to acquire a knowledge of the details of construction of the means for effecting the result, reference is to be had to the following description and accompanying drawings, in which:

Figure 1 is a side view showing the application of the device; Fig. 2 is a transverse sectional view through a wheel provided with the reinforcing blocks; Fig. 3 is a detail perspective view of one of the blocks detached; and, Fig. 4 is a plan view of one of the blocks.

Corresponding and like parts are referred to in the following description and indicated in all the views of the drawings by the same reference characters.

Broadly speaking the invention comprises a series of reinforcing blocks 1 which are located between the spokes 2 of any type of wheel such as is shown in the drawings so as to form a continuous ring and mutually reinforce each other. These reinforcing blocks 1 are formed with sides which converge toward the inner end thereof so as to conform to the radial direction of the spokes and the sides are preferably formed with grooves or depressions 3 to receive the spokes. In the preferred structure, the blocks 1 comprise webs 4 which fit between the spokes and are provided at their opposite ends with flanges 5 which extend outwardly in both directions and are bent so as to form the grooves 3 which receive the spokes. These blocks are arranged between the spokes of the wheel as shown in Fig. 1 and are held rigidly in position by means of bands 6 of wire or other suitable material. One of these bands 6 is preferably located upon each side of the spokes and these bands engage with notches 7 which are formed in lateral extensions 8 upon the outer corners of the flanges 5. In order that the reinforcing blocks may be drawn inwardly so as to form a rigid engagement with the spokes 2, the ends of the bands 6 are in the present instance connected by means of turn-buckles 9. It will thus be apparent that by operating the turn-buckles the bands 6 can be tightened in order to take up any looseness or play in the various members and produce a rigid structure. These reinforcing blocks 1 may be formed of any suitable size according to the type of wheel in connection with which they are employed, and the webs 4 may be given any desirable width according to the distance which it is desired to have the reinforcing members from the hub.

In the practical application of the invention, the shape of the reinforcing blocks may be slightly modified if desirable so as to have an ornamental design and add to rather than detract from the appearance of the wheel.

Having thus described the invention, what is claimed as new is:

1. The combination with a wheel, of a series of reinforcing blocks arranged between the spokes of the wheel so as to form a ring, a band extending around the ring of blocks, and means for drawing the ends of the band together, whereby to circumferentially compress the ring and force the blocks into a close engagement with the spokes.

2. The combination with a wheel, of a series of reinforcing blocks arranged between the spokes of the wheel in circular series, the sides of the blocks being formed with depressions to receive the spokes and the outer ends of the blocks being provided with notches, a band extending around the series of blocks and received in said notches, and means for drawing together the ends of the band, as and for the purpose set forth.

3. The combination with a wheel, of a series of reinforcing blocks arranged between the spokes of the wheel so as to form a continuous ring and mutually reinforce each other, the said blocks comprising a web having oppositely extending flanges at the ends thereof which are adapted to embrace the spokes and having at the opposite outer corners notches, two bands encircling the ring of blocks and received in said notches, and means for drawing the ends of the bands together, as and for the purpose set forth.

4. The combination of a wheel, a series of reinforcing blocks arranged between the spokes of the wheel so as to form a continuous ring and mutually reinforce each other, the said blocks comprising a web having oppositely extending flanges at the ends thereof which are adapted to embrace the spokes, and means for holding the blocks into a close engagement with the spokes.

5. The combination of a wheel, a series of reinforcing blocks arranged between the spokes of the wheel so as to form a continuous ring and mutually reinforce each other, the said blocks comprising a web having oppositely extending flanges at the ends thereof which are adapted to embrace the spokes, and a band extending around the blocks and adapted to hold them in a close engagement with the spokes.

6. The combination of a wheel, a series of reinforcing blocks arranged between the spokes of the wheel so as to form a continuous ring and mutually reinforce each other, the said blocks comprising a web having oppositely extending flanges at the ends thereof which are adapted to embrace the spokes, lateral extensions at the outer corners of the flanges, and a band extending around the reinforcing blocks upon each side of the spokes, said bands engaging with the lateral extensions to force the blocks into a close engagement with the spokes.

In testimony whereof I affix my signature in presence of two witnesses.

CAREY H. BADGER. [L. S.]

Witnesses:
C. E. BOLTON,
ABBIE GOBIN.